J. M. DICK.
Tire-Tightener.

No. 18,138.  
Patented Sept. 8, 1857.

Witnesses:  
Inventor:  
James M. Dick

UNITED STATES PATENT OFFICE.

JAMES M. DICK, OF BUFFALO, NEW YORK.

MODE OF TIGHTENING TIRES OF CARRIAGE-WHEELS.

Specification of Letters Patent No. 18,138, dated September 8, 1857.

*To all whom it may concern:*

Be it known that I, JAMES M. DICK, of Buffalo, in the county of Erie and State of New York, have invented a new and useful Device for Tightening the Tires Upon the Wheels of Wagons and other vehicles, the construction and operation of which I have described in the following specification and illustrated in the accompanying drawing with sufficient clearness to enable competent and skilful workmen in the arts to which it pertains or is most nearly allied to make and use my invention.

My said invention consists in a wedge placed in the felly and drawn up by a screw which passes through the tire, which wedge being forced outward toward the tire expands the felly and thus tightens the tire, as hereinafter more fully set forth.

Figure 1:
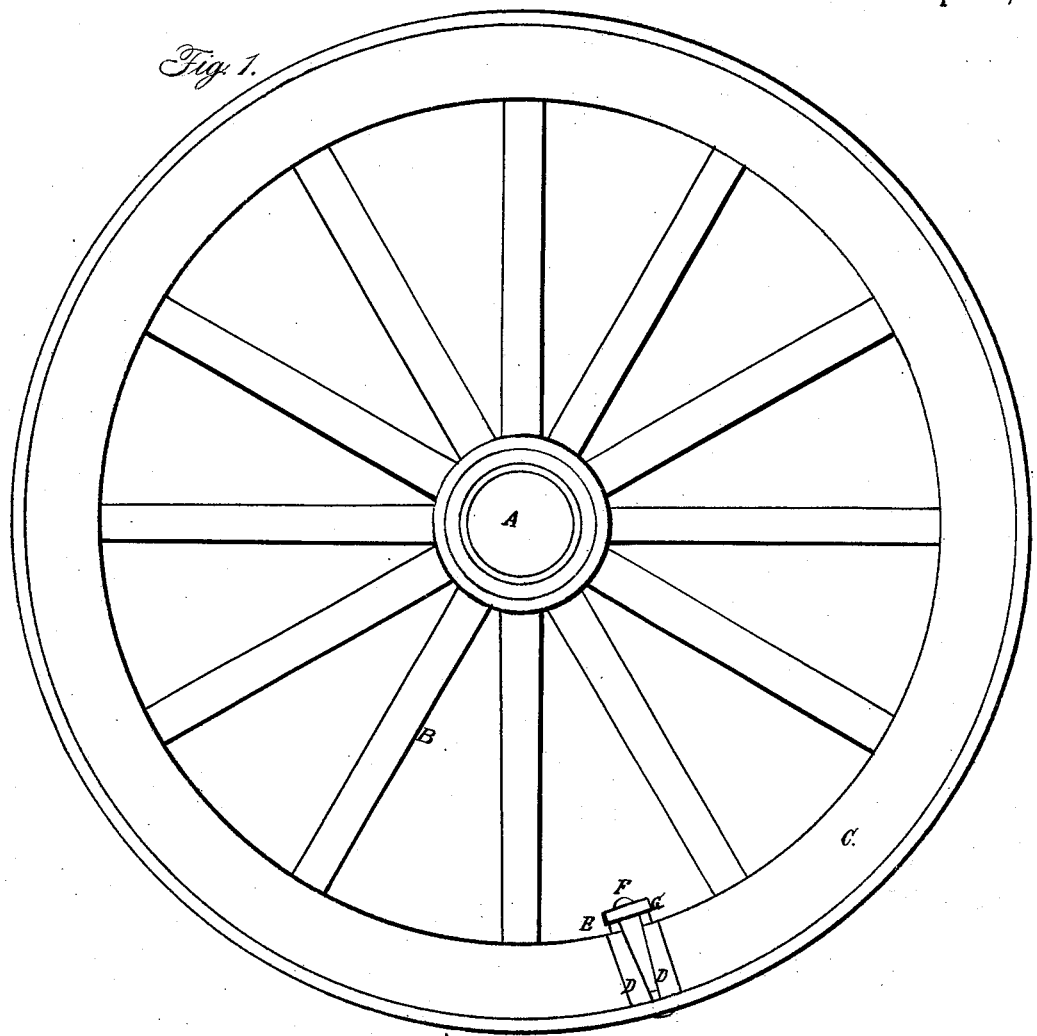
Figure 2:
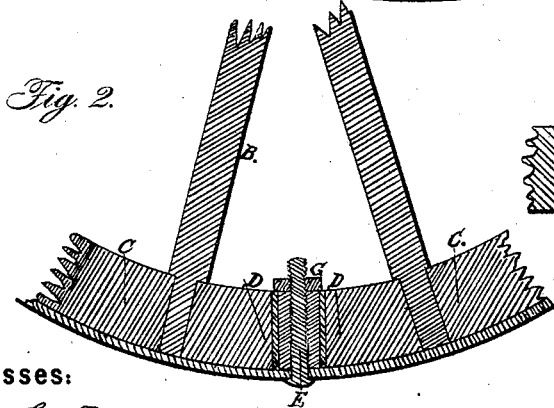
Figure 3:
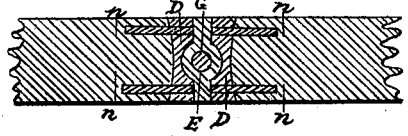

In the accompanying drawings Figure 1 is a side elevation of the wagon wheel with my improvement attached. Fig. 2 is a sectional elevation showing the internal construction of the parts. Fig. 3 is a horizontal section showing also the details of construction.

A is the hub.

B are the spokes, and C the fellies of the wheel.

A recess is cut in the fellies and two pieces of metal D, D, are inserted leaving also room for a wedge shaped piece of metal E to be inserted between them. This piece of metal E has a bolt F passing through it, which also passes through the tire, and is secured upon the outside, or by a sunk head. The wedge shaped piece of metal E is forced down into the opening between the pieces D D by turning a nut G. By this means the fellies can be expanded and the tire tightened to any required extent. The piece E is made circular and nearly parallel in the middle where the bolt passes through it, and the pieces D D are made so as to correspond and allow it to fit into place, the chief bearing being upon the outer portion of the piece E and the pieces D D. These pieces D D are made concave on the side next the end of the felly to secure the felly in place and prevent it from spliting; the felly being further secured by the nails $n$ passing through the pieces D D into the fellies as represented in Fig. 3.

It is a very common thing for tires which are properly set, to wear loose by running upon stony roads, and this often happens when the wagon is at considerable distance from any place at which, according to the present construction, the evil may be remedied. By the use of this device this evil is easily corrected, as the teamster has only to take his wagon wrench and turn down the nut G, to tighten his tire, as soon as he finds it at all loose; and by this means he not only saves the expense of resetting the tire, and the loss of time consequent thereon, but in many instances, the destruction of his wheel for want of a convenient opportunity to get it set.

In setting tires on very light buggy wheels, it is frequently very difficult to adjust the length of the tire with such exactness as to secure at once a perfect fit, and at the same time not have it so tight as to injure the wheel.

By means of my invention a little latitude is allowed in setting the tire, and yet a perfect fit is secured and any danger of destroying the form of the wheel is avoided.

In making this wheel the spokes should be driven entirely through the felly, the outer part of the hole through which it passes should be slightly muzzled, and each spoke firmly wedged in.

The particular improvement which constitutes my said invention, and which I claim as having been originally and first invented by me, is—

The combination of the wedge E and the bolt F, or their equivalents, with the fellies and tire, substantially as set forth.

JAMES M. DICK.

Witnesses:
   D. H. FOGER,
   THOS. P. HOW.